(12) United States Patent
Wang et al.

(10) Patent No.: US 10,397,782 B2
(45) Date of Patent: Aug. 27, 2019

(54) WIRELESS ACCESS AUTHENTICATION

(71) Applicant: HANGZHOU H3C TECHNOLOGIES CO., LTD., Zhejiang (CN)

(72) Inventors: Zhuxun Wang, Beijing (CN); Xiaohu Tang, Beijing (CN); Xiaochen Zhou, Beijing (CN); Yujun Zhang, Beijing (CN); Youhua Cai, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 118 days.

(21) Appl. No.: 15/543,338

(22) PCT Filed: Apr. 29, 2016

(86) PCT No.: PCT/CN2016/080668
§ 371 (c)(1),
(2) Date: Jul. 13, 2017

(87) PCT Pub. No.: WO2016/173536
PCT Pub. Date: Nov. 3, 2016

(65) Prior Publication Data
US 2018/0007551 A1    Jan. 4, 2018

(30) Foreign Application Priority Data

Apr. 30, 2015    (CN) .......................... 2015 1 02217579

(51) Int. Cl.
*H04L 29/06*    (2006.01)
*H04W 12/06*    (2009.01)
*H04W 84/12*    (2009.01)

(52) U.S. Cl.
CPC .......... *H04W 12/06* (2013.01); *H04L 63/0876* (2013.01); *H04L 69/22* (2013.01); *H04W 84/12* (2013.01)

(58) Field of Classification Search
CPC .. H04W 12/06; H04W 84/12; H04L 63/0876; H04L 69/22
See application file for complete search history.

(56) References Cited

U.S. PATENT DOCUMENTS 9,167,430 B2 *  10/2015  Zhao .................... H04W 12/06
9,451,464 B2 *   9/2016  Fan ...................... H04W 12/08
(Continued)

FOREIGN PATENT DOCUMENTS

CN    101588368 A    11/2009
CN    102457493 B     5/2012
(Continued)

OTHER PUBLICATIONS

International Search Report and Written Opinion, International Application No. PCT/CN2016/080668, dated Jul. 27, 2016, pp. 1-7, SIPO.

*Primary Examiner* — Joseph P Hirl
*Assistant Examiner* — Stephen T Gundry
(74) *Attorney, Agent, or Firm* — Hewlett Packard Enterprise Patent Department (57) ABSTRACT

Examples relate to a method and a device for wireless access authentication. The method is applied to an intelligent gateway which is previously associated with account information of a user. The intelligent gateway may receive an access authentication packet comprising an authentication identification indicating a terminal device; the intelligent gateway may construct an identity verification packet comprising an authentication identification indicating the terminal device and an association account identification indicating an account registered on the intelligent gateway; the intelligent gateway may send the identity verification packet to a cloud server; the intelligent gateway may permit a terminal device corresponding to authentication identifica- (Continued)

tion carried in a verification success packet returned by the cloud server to pass the access authentication.

18 Claims, 6 Drawing Sheets

(56) References Cited

U.S. PATENT DOCUMENTS

| | | | | |
|---|---|---|---|---|
| 9,465,668 | B1* | 10/2016 | Roskind | G06F 9/5072 |
| 9,749,320 | B2* | 8/2017 | Fan | H04W 8/26 |
| 2006/0114863 | A1* | 6/2006 | Sanzgiri | H04L 63/1466 370/338 |
| 2007/0258508 | A1* | 11/2007 | Werb | H04W 84/18 375/140 |
| 2010/0217837 | A1* | 8/2010 | Ansari | G06Q 30/04 709/218 |
| 2014/0181933 | A1 | 6/2014 | Sanjeev et al. | |
| 2015/0072653 | A1* | 3/2015 | Fan | H04W 12/08 455/411 |
| 2015/0188949 | A1* | 7/2015 | Mahaffey | H04L 63/20 726/1 |
| 2015/0295929 | A1* | 10/2015 | Fan | H04W 8/26 726/7 |
| 2015/0347683 | A1* | 12/2015 | Ansari | H04L 63/08 726/7 |
| 2015/0350854 | A1* | 12/2015 | Pollack | H04W 4/12 455/466 |
| 2015/0365403 | A1* | 12/2015 | Counterman | H04L 63/0876 726/9 |
| 2016/0021635 | A1* | 1/2016 | Lee | H04W 12/06 455/411 |
| 2016/0087957 | A1* | 3/2016 | Shah | H04L 63/205 726/1 |
| 2016/0119316 | A1* | 4/2016 | Liu | H04L 63/061 713/171 |
| 2016/0127902 | A1* | 5/2016 | Ciarniello | H04L 63/0838 380/247 |
| 2016/0142402 | A1* | 5/2016 | Kim | H04L 63/08 726/4 |
| 2016/0308862 | A1* | 10/2016 | Rolfe | H04L 9/3236 |
| 2017/0104633 | A1* | 4/2017 | Wen | H04W 24/08 |
| 2017/0187703 | A1* | 6/2017 | Enrique Salpico | G06F 21/44 |
| 2017/0339626 | A1* | 11/2017 | Mustajarvi | H04W 12/06 |
| 2017/0344703 | A1* | 11/2017 | Ansari | H04L 63/0876 |
| 2017/0366388 | A1* | 12/2017 | Begeer | H04L 29/06952 |
| 2018/0007551 | A1* | 1/2018 | Wang | H04L 63/0876 |

FOREIGN PATENT DOCUMENTS

| | | |
|---|---|---|
| CN | 103051631 B | 4/2013 |
| CN | 103179115 B | 6/2013 |
| CN | 103873454 A | 6/2014 |
| GB | 2517528 A | 2/2015 |

* cited by examiner

WIRELESS ACCESS AUTHENTICATION

BACKGROUND

In wireless local area network (WLAN) technology, many wireless authentication protocols such as Wireless-Fidelity (WIFI), ZigBee, and Bluetooth have been proposed. Terminal devices such as smart phones, smart tablet computers, smart bracelets, and compound intelligent gateways may support several wireless authentication protocols used in different WLANs. Nevertheless, when a terminal device intends to access several different WLANs, the terminal device is subject to multiple wireless access authentications according to the wireless authentication protocols supported by access points (APs) of each WLAN such as an intelligent gateway and a relay device. The wireless access authentication operation may include for example inputting a username and password.

DETAILED DESCRIPTION OF THE EMBODIMENTS

Figure 1:
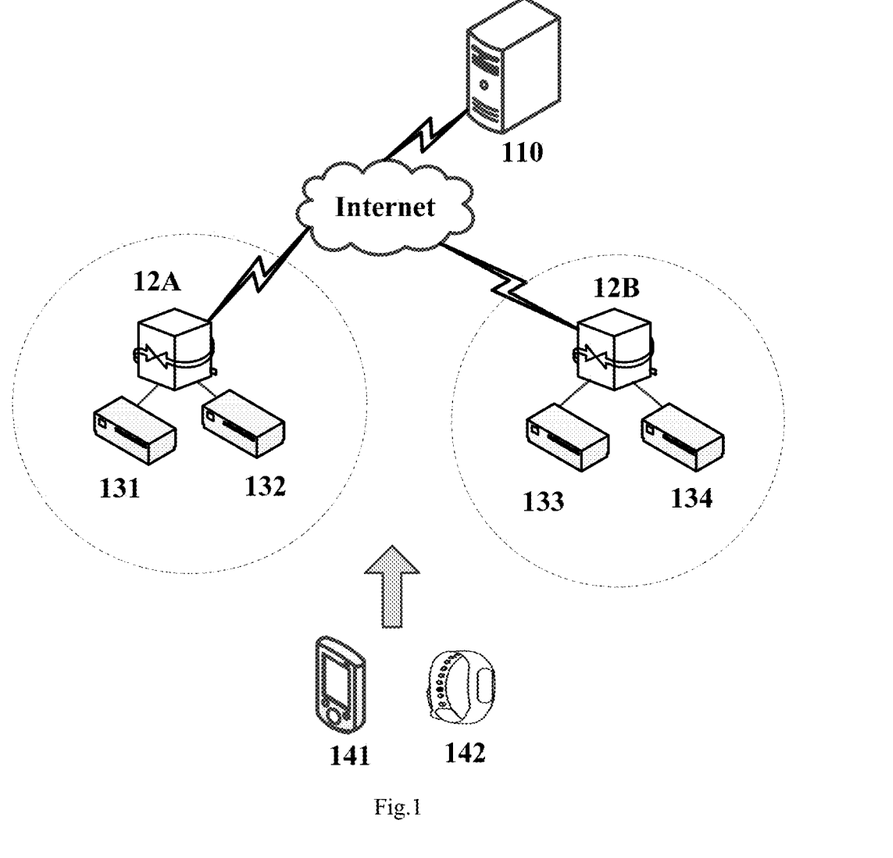
FIG. 1 is a schematic diagram illustrating a network structure according to an example of the disclosure.

FIG. 1 is a schematic diagram illustrating a network structure according to an example of the disclosure. Referring to FIG. 1, a cloud server 110 may establish connection with several intelligent gateways located in different areas via Internet. For instance, the cloud server 110 may connect with intelligent gateway 12A and intelligent gateway 12B respectively. Relay devices 131 and 132 may access a network through the intelligent gateway 12A, and relay devices 133 and 134 may access a network through the intelligent gateway 12B. Terminal devices 141 and 142 may support many wireless authentication protocols. In a unified authentication mode, if intend to access several different WLANs, terminal devices 141 and 142 are to subject to multiple wireless access authentications according to the wireless authentication protocols supported by wireless APs of each WLAN. For instance, in case that relay devices 131-134 are based on different authentication protocols, when a terminal device such as cell phone 141 accesses relay devices 131-134, the user will perform predetermined authentication action for the terminal device according to the respective authentication protocols of relay devices 131-134, such as inputting a password for authentication authority.

According to the method for wireless access authentication, an intelligent gateway may be previously associated with account information of an account registered on the intelligent gateway on a cloud server. The account information may include identity information such as a username, password for verification authority, and information of a trusted terminal device corresponding to the account. And wherein, the number of trusted terminal devices corresponding to the account may be one or more, and the information of the trusted terminal device may be, for example, the address of the device and referred to "trusted terminal device information" hereinafter. When receiving an access authentication packet, the intelligent gateway may construct an identity verification packet by using authentication identification of a terminal device to access a WLAN, which is carried in the access authentication packet, and identity information (such as a username) of an account previously registered on the intelligent gateway. And wherein, the authentication identification may be mentioned as "access authentication identification", and the identity information may be mentioned as "association account identification". Then the intelligent gateway may transmit the constructed identity verification packet to the cloud server. When the cloud server determines the terminal device corresponding to the access authentication identification as a trusted terminal device according to the access authentication identification and the association account identification, the terminal device corresponding to the access authentication identification is permitted to pass the access authentication. Consequently, when the terminal device intends to access multiple different WLANs, this method may be used for unified authentication instead of security verification for each WLAN. In this way, operations on wireless access authentication can be reduced and less authentication information during the authentication process will be generated, which avails to intelligent gateway management.

Figure 2:
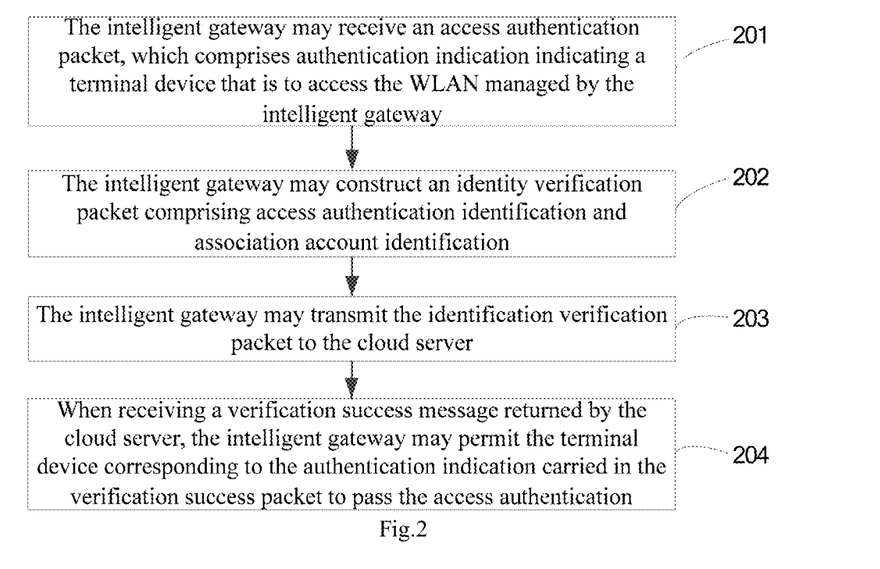
FIG. 2 illustrates a flowchart of a method for wireless access authentication according to an example of the disclosure.

Referring to FIG. 2, the flowchart of the method for wireless access authentication according to an example is illustrated. This method can be applied to intelligent gateway. The cloud server may save account information of an account previously registered on intelligent gateway. The account information may include, for example, a username, password, and the address of trusted terminal device. The method may comprise following blocks.

At block 201, the intelligent gateway may receive an access authentication packet, which comprises authentication identification indicating a terminal device that is to access the WLAN managed by the intelligent gateway.

In this example, when the terminal device makes a request to access the WLAN, the intelligent gateway may receive the access authentication packet sent by the terminal device, the access authentication packet comprises the authentication identification of the terminal device. The authentication identification may be the hardware address of the terminal device, such as the Media Access Control (MAC) address, the Bluetooth address, the ZigBee address and the electronic label of the terminal device.

At block 202, the intelligent gateway may construct an identity verification packet, which comprises access authentication identification and association account identification, and the access authentication identification represents the authentication identification of the terminal device carried in the access authentication packet, the association account identification indicates an account previously registered on the intelligent gateway.

After acquiring the authentication identification of the terminal device carried in the access authentication packet, the intelligent gateway may construct an identity verification packet according to the authentication identification and the identity information of the account previously registered on the intelligent gateway.

When initially setting the intelligent gateway, the user may register account information of an account on the intelligent gateway, for example, by logging in a client interface of the intelligent gateway. For example, the user may set information such as a username, password and the address of a trusted terminal device on the client interface. After acquiring the account information registered by the user, the intelligent gateway may further transmit the account information to the cloud server. Then the cloud server may establish correspondence between the account information and the intelligent gateway, and accordingly the association between the intelligent gateway and the registered account information is accomplished in the cloud server. Further, the account registered on the intelligent gateway may be saved as a trusted account in the cloud server. In an example, the cloud server may acquire a character string of a fixed length by calculating information such as address information of the intelligent gateway, timestamp (information such as year, month, day, and the current time) and a period of validity with a predetermined algorithm. And the cloud server may transmit the character string as a security code to the intelligent gateway. In this way, when constructing an identity verification packet as follows, the intelligent gateway may add the security code acquired from the cloud server in advance to the identity verification packet.

At block 203, the intelligent gateway may transmit the identity verification packet to the cloud server, which saves account information of one or more trusted accounts in advance.

In this disclosure, the intelligent gateway may send information of the account previously registered on intelligent gateway to the cloud server, wherein the information includes a username, password, the address of trusted terminal device, etc. Thus the cloud server may collect all information of one or more trusted devices corresponding to one account. After that, when the intelligent gateway receives an access authentication packet, it may take authentication identification of a terminal device to access the WLAN, which is carried in the access authentication packet, as access authentication identification, and take identity information of the account registered on the intelligent gateway as association account identification. Then the intelligent gateway may construct an identity verification packet with the access authentication identification and the association account identification and send it to the cloud server to verify whether the terminal device corresponding to the access authentication identification is a trusted terminal device of the account corresponding to the association account identification. If the terminal device corresponding to the access authentication identification is a trusted terminal device, the cloud server may return to the intelligent gateway a verification success packet carried with the access authentication identification, so that the intelligent gateway may confirm that the terminal device corresponding to the access authentication identification is trusted.

At block 204, when receiving the verification success packet from the cloud server, the intelligent gateway may permit the terminal device corresponding to the access authentication identification carried in the verification success packet to pass the access authentication.

When receiving the verification success packet from the cloud server, the intelligent gateway may determine the terminal device corresponding to the access authentication identification carried in the verification success packet as a trusted terminal device, thus permits the terminal device to access the WLAN managed by the intelligent gateway.

According to the method for wireless access authentication, the intelligent gateway may be associated in advance with the account information of the account registered on the intelligent gateway on the cloud server. When receiving the access authentication packet, the intelligent gateway may determine the authentication identification of the terminal device to access the WLAN, which is carried in the access authentication packet, as the access authentication identification. And the intelligent gateway may determine the identity information of the account previously registered on the intelligent gateway as the association account identification. Then the intelligent gateway may construct the identity verification packet with the access authentication identification and the association account identification, and send it to the cloud server. When determining the terminal device corresponding to the access authentication identification as a trusted terminal device based on the access authentication identification and the association account identification carried in the identity verification packet, the cloud server may send the verification success packet carried with the access authentication identification to the intelligent gateway, so as to permit the terminal device corresponding to the access authentication identification to pass the access authentication. Consequently, when a terminal device intends to access multiple different WLANs, this method can be used for unified authentication instead of security verification for each WLAN. In this way, user operations can be reduced and less authentication information during the authentication process will be generated, which avails to intelligent gateway management.

In another example, the intelligent gateway may also receive the access authentication packet from a relay device wherein the relay device may be previously registered on the intelligent gateway. For example, when a terminal device makes a request to access a WLAN managed by the intelligent gateway via a relay device, the terminal device may send to the relay device an access authentication packet carried with the authentication identification of the terminal device. After receiving the access authentication packet, the relay device may reconstruct and send a new access authentication packet to the intelligent gateway according to the authentication identification carried in the access authentication packet. The terminal device may perform the access authentication by using its own hardware address such as MAC address as the authentication identification, and the source address of the access authentication packet reconstructed by the relay device will be the address of the relay device instead of the address of the terminal device. Therefore, the relay device may add the authentication identification of the terminal device into a preset field of the reconstructed access authentication packet, for the sake that the intelligent gateway may acquire the hardware address of the terminal device to perform the access authentication.

In this situation, when receiving the access authentication packet reconstructed by the relay device, the intelligent gateway may determine whether the received access authentication packet includes the preset field before constructing the identity verification packet. If the access authentication packet does not include the preset field, then the intelligent gateway may determine the source MAC address of the access authentication packet as the authentication identification of the terminal device. If the access authentication packet includes the preset field, then the intelligent gateway may extract the authentication identification of the terminal device from the preset field of the access authentication packet as the access authentication identification, and determine the identity information such as a username of the account registered on the intelligent gateway as the association account identification. Then the intelligent gateway may construct an identity verification packet with the access authentication identification and the association account identification and transmit it to the cloud server. According to the association account identification and the access authentication identification carried in the identity verification packet, when the cloud server locally finds out a record matching the access authentication identification in the trusted terminal device information of the trusted account corresponding to the association account identification, the terminal device corresponding to the access authentication identification may be determined as a trusted terminal device. And thereby, a verification success packet carried with the access authentication identification may be returned to the intelligent gateway. After receiving the verification success packet, the intelligent gateway may inform the relay device to allow the terminal device corresponding to the access authentication identification in the verification success packet to access the WLAN managed by the intelligent gateway via the relay device. When the cloud server cannot find out a record of the trusted terminal device matching the access authentication identification locally according to the association account identification carried in the identity verification packet, the terminal device corresponding to the access authentication identification may be determined as a distrusted terminal device. And thereby, a verification failure packet carried with the access authentication identification may be returned to the intelligent gateway. After receiving the verification failure packet, the intelligent gateway may inform the relay device to request the terminal device corresponding to the access authentication identification perform manual authentication. For example, a user may input the account information such as a username and password previously registered on the intelligent gateway. And after the terminal device passes the manual authentication, the intelligent gateway allows the terminal device to access the WLAN managed by the intelligent gateway via the relay device. The relay device may send the authentication identification of the terminal device to the cloud server via the intelligent gateway after the terminal device passes the manual authentication. Therefore, the cloud server may establish correspondence between the authentication identification of the terminal device and the account information previously registered on the intelligent gateway. For example, the cloud server may add the authentication identification of the terminal device to the trusted terminal device information of the account registered on the intelligent gateway. Thus, when the terminal device is to subject to wireless access authentication the next time, it may be determined as a trusted terminal device according to the correspondence. Therefore, no more manual authentication is needed, moreover user operations can be reduced and the authentication efficiency can be improved.

The intelligent gateway may perform a similar process to the access authentication packet directly received from the terminal device. In other words, the intelligent gateway may determine whether the received access authentication packet includes the preset field before constructing the identity verification packet, and then proceeds correspondingly.

In another example, when the terminal device to access the WLAN supports multiple wireless access protocols, the authentication identification of the terminal device may comprise multiple hardware addresses such as MAC address, Bluetooth address, ZigBee address, and electrical label. In order for the intelligent gateway to obtain all the hardware addresses of the terminal device efficiently, the terminal device may add a specific field in a predetermined position of an access authentication packet to transmit the access authentication packet, and the specific field may comprise all the hardware addresses of the terminal device. Therefore, when the intelligent gateway receives the access authentication packet from the terminal device, it may quickly obtain all the hardware addresses of the terminal device by analyzing the specific field in the access authentication packet, and the obtained hardware addresses may be used as the authentication identification of the terminal device, thereby improving the processing efficiency of access authentication.

In another example, when the relay device reconstructs a new access authentication packet based on the access authentication packet from the terminal device, it may also add the content of the specific field in the access authentication packet to the preset field in the newly reconstructed access authentication packet. Thus the intelligent gateway may obtain all the hardware addresses of the terminal device as the access authentication identification efficiently.

Figure 3:
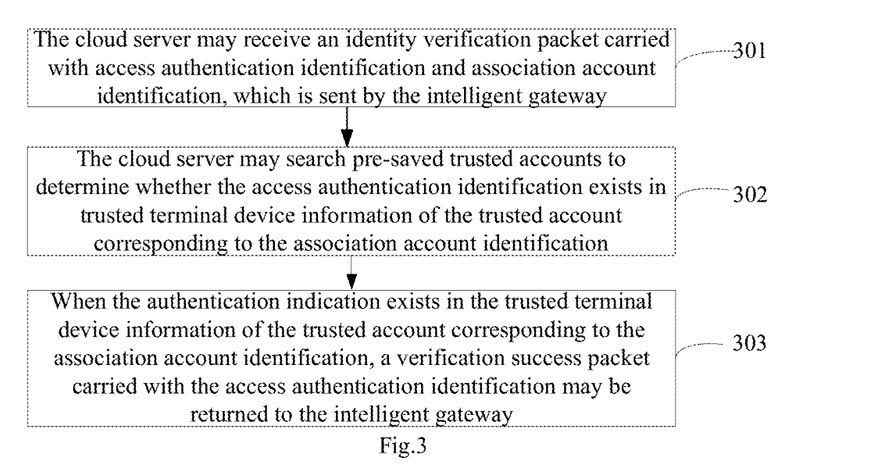
FIG. 3 illustrates a flowchart of a method for wireless access authentication according to an example of the disclosure.

Referring to FIG. 3, it illustrates a flowchart of a method for wireless access authentication applied on a cloud server according to an example of the present disclosure. The cloud server may associate an intelligent gateway and account information of an account registered on the intelligent gateway in advance. The account information may comprise identity information such as a username, password for verification authority and the addresses of one or more trusted terminal devices corresponding to the account. This method comprises the following steps.

At block 301, the cloud server may receive an identity verification packet carried with access authentication identification and association account identification, which is sent by the intelligent gateway. The access authentication identification represents authentication identification indicating a terminal device which is to access the WLAN managed by the intelligent gateway. The association account identification indicates an account previously registered on the intelligent gateway.

When receiving the identity verification packet from the intelligent gateway, the cloud server may acquire the access authentication identification and the association account identification carried in the identity verification packet. The access authentication identification may comprise one or more of the MAC address, the Bluetooth address, the ZigBee address, the electrical label of the terminal device, etc. The association account identification may be identity information such as the username of the account previously registered on the intelligent gateway.

At block 302, the cloud server may search pre-saved trusted accounts to determine whether the access authentication identification exists in trusted terminal device information of the trusted account corresponding to the association account identification.

The cloud server may search, in the locally-saved trusted accounts, the account information corresponding to the association account identification carried in the identity verification packet. Then the cloud server may determine whether a record matching the access authentication identification exists in the account information.

At block 303, when the access authentication identification exists in the trusted terminal device information of the trusted account corresponding to the association account identification, a verification success packet carried with the access authentication identification may be returned to the intelligent gateway.

When the access authentication identification exists in the trusted terminal device information of the trusted account corresponding to the association account identification stored in the cloud server, the cloud server may determine the terminal device corresponding to the access authentication identification to be a trusted terminal device. Thus, a verification success packet carried with the access authentication identification may be returned to the intelligent gateway which sent the identity verification packet. If the access authentication identification does not exist in the trusted terminal device information, the terminal device may be determined to be a distrusted terminal device, and a verification failure packet carried with the access authentication identification may be returned to the intelligent gateway.

In another example, the cloud server may receive the account information which is previously registered on the intelligent gateway and sent by the intelligent gateway, and establish correspondence between the account information and the intelligent gateway. Further, the cloud server may obtain a character string of a fixed length by calculating the information such as address information of the intelligent gateway, timestamp (information such as year, month, day, and the current time) and a period of validity with a predetermined algorithm. The obtained character string may be distributed as a security code to the intelligent gateway. In this way, the cloud server may firstly check the security code when performing access authentication for the terminal device the next time. If the identity verification packet from the intelligent gateway does not carry any security code or the security code carried in the identity verification packet is invalid, then the intelligent gateway may be instructed to send the account information registered thereon to the cloud server again. Thus, the intelligent gateway may regain a security code, and perform the access authentication of the terminal device again based on the regained security code. Therefore the disclosure may ensure the uniformity between the account information registered on the intelligent gateway and the account information saved on the cloud server, moreover the security of the internet may be improved.

In another example, for the sake of preventing hostile attack, the cloud server may also restrict the number of authentication repeat times of a same network node by judging the MAC address or IP address of the network node. For instance, when authentication of the same network node fails several times (such as three times), the network node should be restricted to authenticate again for a period. Accordingly, the security of the access authentication process may be improved.

Hereinafter, referring to the network structure illustrated in FIG. 1, a further detailed description according to an example will be given as follows.

Suppose that a user employs compound intelligent gateways 12A and 12B as data processing backbones respectively in residences in city A and city B. The user may log in the client interfaces of intelligent gateways 12A and 12B respectively by using a terminal device such as personal laptop. The user may register unified account information N on the client interfaces, wherein the unified account information N may comprise a username, password and trusted terminal device information, etc. The trusted terminal device information may comprise one or more of the MAC address, the Bluetooth address, the ZigBee address and the electronic label of the terminal device, etc. After the user registered successfully, intelligent gateways 12A and 12B may encapsulate the account information N into a register request (Register REQ) packet and send it to the cloud server 110, respectively. For example, the intelligent gateway 12A may encrypt the account information such as username and password, and encrypt the trusted terminal device information such as the MAC address, the Bluetooth address, the ZigBee address and the electronic label of the personal laptop mentioned above according to a predetermined algorithm. Then the intelligent gateway 12A may fill the encrypted account information and the encrypted trusted terminal device information in different predetermined positions of the Register REQ packet, respectively. Additionally, the encapsulated Register REQ packet may carry MAC address MACA of the intelligent gateway 12A, and the MAC address MACA may be used as the identification of the intelligent gateway 12A. The process of the intelligent gateway 12B is similar, therefore, is not described here.

When receiving the Register REQ packets respectively from the intelligent gateway 12A and 12B, the cloud server 110 may further determine whether the username and password in Register REQ packet are correct. If they are correct, the cloud server 110 may associate the MAC addresses MACA, MACB of the intelligent gateways 12A and 12B with account information N respectively. And as a response to the Register REQ packet, the cloud server 110 may send back a register acknowledgement (Register ACK) packet and security codes M1, M2 to the intelligent gateways 12A and 12B, respectively. If the username and password are not correct, the cloud server 110 may send back a register non-acknowledgement (Register NAK) packet to the intelligent gateways 12A and 12B as a response to Register REQ packet. The Register NAK packet may instruct the intelligent gateways 12A and 12B to reregister the account information. When receiving the Register ACK packet returned from the cloud server 110, the intelligent gateways 12A and 12B may determine that the account information N registers successfully on cloud server 110, and the intelligent gateways 12A and 12B may update the security code by sending Register REQ packet periodically. When successfully associating with the account information on cloud server 110, the intelligent gateways 12A and 12B may also locally establish a legal user database based on the associated account information, and the users in the legal user database are allowed to acquire WLAN access authority. Thus, other users may be forbidden to perform access authentication on the intelligent gateways 12A and 12B. The following two examples will be described to show how to carry out the wireless access authentication of this disclosure by using account information N.

EXAMPLE 1

As shown in FIG. 1, suppose that a user uses a cell phone 141 (i.e., a terminal device 141) to make a request to access the WLAN managed by intelligent gateway 12A by WIFI for the first time in residence in city A. The interactive process among the cell phone 141, intelligent gateway 12A and cloud server 110 may be shown in FIG. 4a.

Figure 4A:
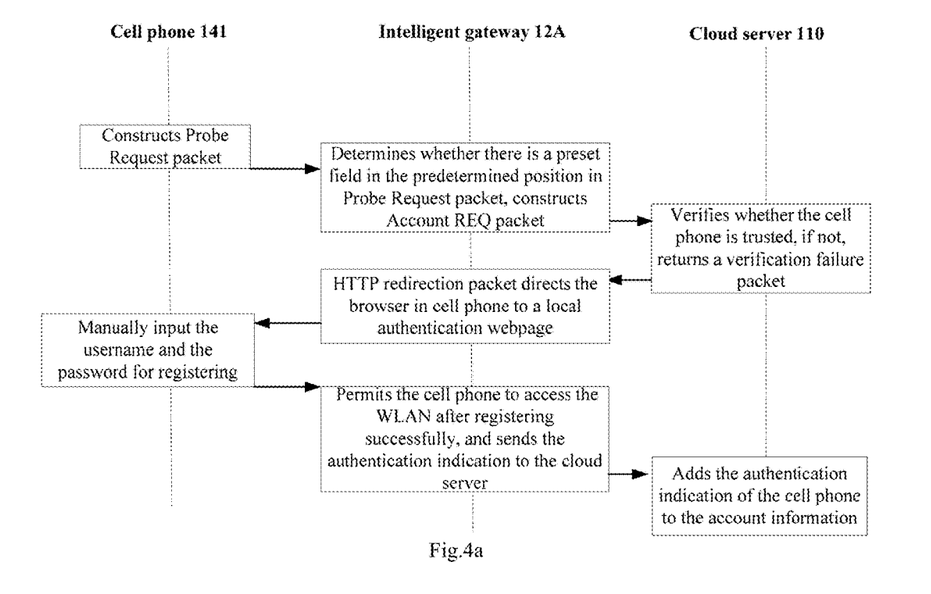
FIG. 4a schematically illustrates an interacting process of a method for wireless access authentication according to an example of the disclosure.

The intelligent gateway 12A may send a Beacon frame in a Beacon Interval, and a non-encryption mode of authentication is designated in the Beacon frame. When the wireless function of the cell phone 141 is ON, the cell phone 141 may keep up monitoring in the Industrial Scientific Medical (ISM) band. The ISM band used in industry, science, medicine fields, etc. may be 2.4 GHz and 5 GHz at present. When receiving the Beacon frame from the intelligent gateway 12A, the cell phone 141 may add the Service Set Identifier (SSID) of intelligent gateway 12A to the wireless channel list of the cell phone 141. In this example, the cell phone 141 may connect to the intelligent gateway 12A by WIFI. However, the user may decide which network the cell phone 141 is to access according to the SSID, or the Cell phone 141 may also automatically choose the network to be accessed. For example, the cell phone 141 may automatically connect the network with the strongest signal coverage according to the Received Signal Strength Identification (RSSI). Suppose the cell phone 141 chooses to access the wireless network managed by intelligent gateway 12A, then it may construct a wireless access authentication Probe Request packet and send it to the intelligent gateway 12A. The source MAC address of the access authentication Probe Request packet is the MAC address MAC0 of the cell phone 141. Suppose no preset field is added in the predetermined position of the access authentication Probe Request packet, then the source MAC address MAC0 may be considered as the authentication identification of the cell phone 141 to access the WLAN.

When receiving the access authentication Probe Request packet from the cell phone 141, the intelligent gateway 12A may determine whether there is a preset field in the predetermined position of the access authentication Probe Request packet. If the access authentication Probe Request packet does not include the preset field, then the intelligent gateway 12A may determine the source MAC address MAC0 of the access authentication Probe Request packet as the access authentication identification of the cell phone 141. And the intelligent gateway 12A may encrypt the access authentication identification of MAC0, identity information (mentioned as the association account identification thereinafter) such as a username of account information N associated with the intelligent gateway 12A, and security code M1 with a predetermined encryption algorithm. Then the intelligent gateway 12A may add the encrypted information to an identity verification Account REQ packet with the source MAC address of MACA (i.e., the MAC address of the intelligent gateway 12A), and send the identity verification Account REQ packet to the cloud server 110.

After decrypting the received identity verification Account REQ packet by using a decryption algorithm corresponding to the predetermined encryption algorithm, the cloud server 110 may determine whether the access authentication identification of MAC0 carried in the identity verification Account REQ packet exists in the trusted terminal device information of account information N corresponding to the association account identification carried in the identity verification Account REQ packet. Since the cell phone 141 corresponding to the access authentication identification of MAC0 has not been registered on the cloud server 110, the cloud server 110 may determine the terminal device corresponding to the MAC0 is not a trusted terminal device in account information N, and return a verification failure packet to the intelligent gateway 12A.

After receiving the verification failure packet, the intelligent gateway 12A may determine that the cell phone 141 is not a trusted terminal device in the account information N, and send to the cell phone 141 an HTTP redirection packet for directing the browser in the cell phone 141 to a local authentication webpage. Only after a user inputs the username and the password of the account information N having been registered on the intelligent gateway 12A on the local authentication webpage, the cell phone 141 may get the authority to access the wireless network managed by intelligent gateway 12A. Furthermore, the intelligent gateway 12A may also send the MAC address MAC0 of the cell phone 141 and the account information N registered on intelligent gateway 12A to the cloud server 110, so that the cloud server may add the MAC address MAC0 of the cell phone 141 to the trusted terminal device information of the account information N.

Figure 4B:
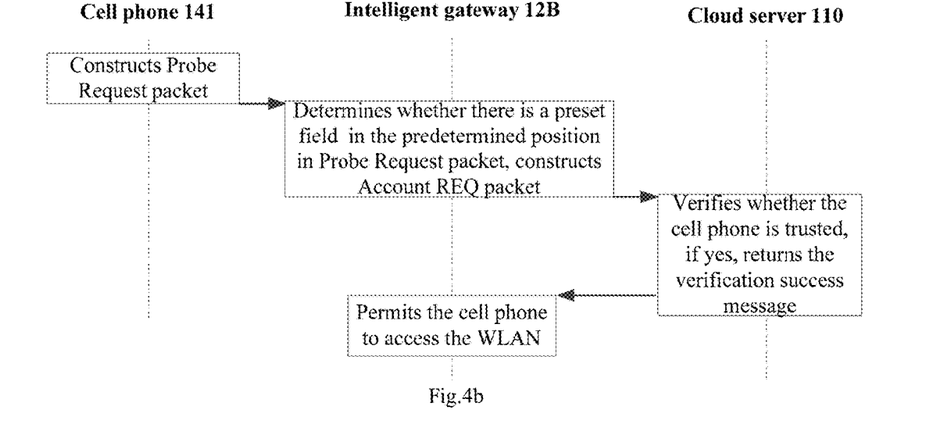
FIG. 4b schematically illustrates an interacting process of a method for wireless access authentication according to an example of the disclosure.

Suppose that the user arrives at the residence in city B later, when the user uses the cell phone 141 to access the WLAN managed by the intelligent gateway 12B through WIFI for the first time, the interaction process among the cell phone 141, the intelligent gateway 12B and the cloud server 110 is showed in FIG. 4b.

The intelligent gateway 12B may send a Beacon frame in a Beacon Interval, and a non-encryption mode of authentication is designated in the Beacon frame. When the wireless function of the cell phone 141 is ON, the cell phone 141 may keep up monitoring in the ISM band. When receiving the Beacon frame from the intelligent gateway 12B, the cell phone 141 may add the SSID of the intelligent gateway 12B to the wireless channel list of the cell phone 141. The cell phone 141 may send an access authentication Probe Request packet to the intelligent gateway 12B. The source MAC address of the access authentication Probe Request packet is the MAC address MAC0 of the cell phone 141. Since there is no preset field in a predetermined position of the access authentication Probe Request packet, thus the source MAC address MAC0 may be determined as the authentication identification of the cell phone 141 to access the WLAN.

After receiving the access authentication Probe Request packet from the cell phone 141, the intelligent gateway 12B finds out that there is no preset field in the predetermined position of the access authentication Probe Request packet, and may determine the source MAC address MAC0 of the access authentication Probe Request packet as the access authentication identification of the cell phone 141. And the intelligent gateway 12B may encrypt the access authentication identification of MAC0, identity information (mentioned as the association account identification thereinafter) such as a username of account information N associated with intelligent gateway 12B, and security code M2 with a predetermined encryption algorithm. Then the intelligent gateway 12B may add the encrypted information to an identity verification Account REQ packet with the source MAC address of MACB (i.e., the MAC address of the intelligent gateway 12B), and send the identity verification Account REQ packet to the cloud server 110.

After decrypting the received identity verification Account REQ packet by using a decryption algorithm corresponding to the predetermined encryption algorithm, the cloud server 110 may determine whether the access authentication identification of MAC0 carried in the identity verification packet exists in the trusted terminal device information of account information N corresponding to the association account identification carried in the identity verification packet. Since the cell phone 141 corresponding to the access authentication identification of MAC0 has been registered on the cloud server 110, the cloud server 110 may determine the terminal device corresponding to the MAC0 is a trusted terminal device in account information N, and return a verification success packet to the intelligent gateway 12B.

After receiving the verification success packet, the intelligent gateway 12B may permit the cell phone 141 to access the wireless network managed by the intelligent gateway 12B, without inputting a username and password again for access authentication.

EXAMPLE 2

As shown in FIG. 1, suppose that a user uses a Bluetooth speaker as a relay device 131 in the residence in city A, and sets the intelligent gateway 12A as an authentication server; and uses an smart lamp supporting ZigBee connection as a relay device 133 in the residence in city B, and sets the intelligent gateway 12B as an authentication server. Therefore, the Bluetooth speaker 131 and the smart lamp 133 may accomplish registration via the intelligent gateways 12A and 12B.

Figure 5A:
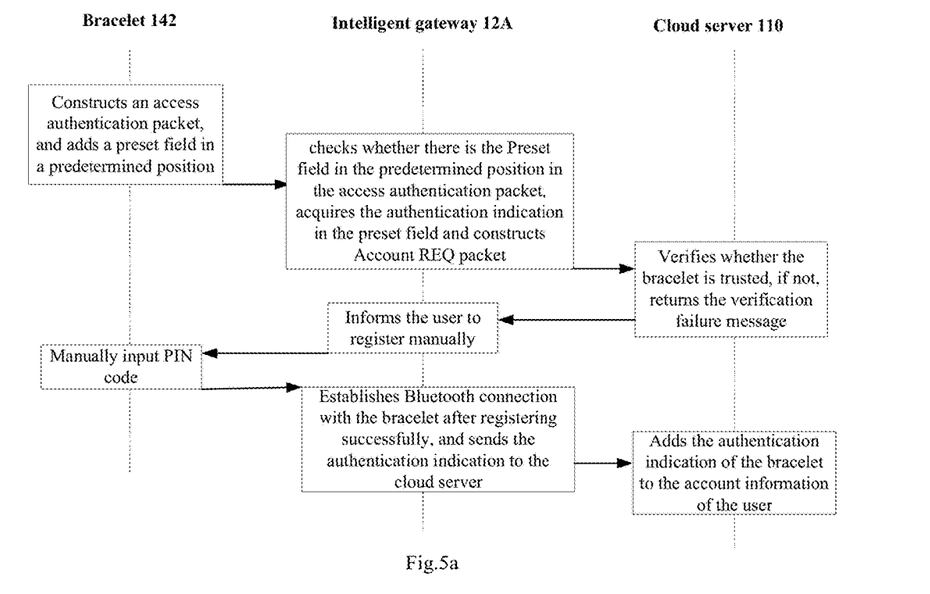
FIG. 5a schematically illustrates an interacting process of a method for wireless access authentication according to an example of the disclosure.

Suppose the user uses a bracelet as terminal device 142 in the FIG. 1, when the user accesses the bracelet 142 into the WLAN managed by the intelligent gateway 12A via Bluetooth for the first time in the residence in city A, the interaction process among the bracelet 142, the intelligent gateway 12A and the cloud server 110 is shown in FIG. 5a.

The bracelet 142 may construct a Bluetooth access authentication packet and sends it to the intelligent gateway 12A. Suppose a preset field is added in a predetermined position of the Bluetooth access authentication packet, the preset field carries information such as MAC address, Bluetooth address and ZigBee address of the bracelet 142. Then the authentication identification of the terminal device to access the WLAN, which is carried in the Bluetooth access authentication packet, may be considered to comprise the MAC address, the Bluetooth address and the ZigBee address of the bracelet 142.

After receiving the Bluetooth access authentication packet from the bracelet 142, the intelligent gateway 12A may determine whether there is a preset field in the predetermined position of the Bluetooth access authentication packet. When determining that the Bluetooth access authentication packet includes a preset field, the intelligent gateway 12A may extract the information such as MAC address, Bluetooth address and ZigBee address of the preset field in the predetermined position of the Bluetooth access authentication packet as access authentication identification of the bracelet 142. And the intelligent gateway 12A may determine the identity information of account information N registered on the intelligent gateway 12A as association account identification. After encrypting the access authentication identification, the association account identification and security code M1 with a predetermined encryption algorithm, the intelligent gateway 12A may add the encrypted information to the identity verification Account REQ packet with the source MAC address of MACA. And wherein, the security code M1 may be acquired when the intelligent gateway 12A registered on the cloud server 110. Then the intelligent gateway 12A may send the identity verification Account REQ packet to the cloud server 110.

After decrypting the received identity verification Account REQ packet according to a decryption algorithm corresponding to the encryption algorithm, the cloud server 110 may determine whether a record matching the access authentication identification (such as MAC address, Bluetooth address and/or ZigBee address of the bracelet 142) carried in the identity verification Account REQ packet exists in the trusted terminal device information of account information N corresponding to the association account identification carried in the identity verification Account REQ packet. Since the bracelet 142 has not been registered on the cloud server 110, the cloud server 110 may determine that the bracelet 142 is not a trusted terminal device, and return a verification failure packet to the intelligent gateway 12A.

After receiving the verification failure packet, the intelligent gateway 12A may determine that the bracelet 142 is not a trusted terminal device in the account information N. Therefore the intelligent gateway 12A may inform the user to manually input the PIN code matching the bracelet 142, and then establish Bluetooth connection with the bracelet 142. At this time, the bracelet 142 may get all authorities to access the wireless network managed by the intelligent gateway 12A. Furthermore, the intelligent gateway 12A may send the MAC address, the Bluetooth address and the ZigBee address of the bracelet 142 and account information N associated with the intelligent gateway 12A to the cloud server 110, so that the cloud server 110 may add the MAC address, the Bluetooth address and the ZigBee address of the bracelet 142 to the trusted terminal device information in account information N.

Figure 5B:
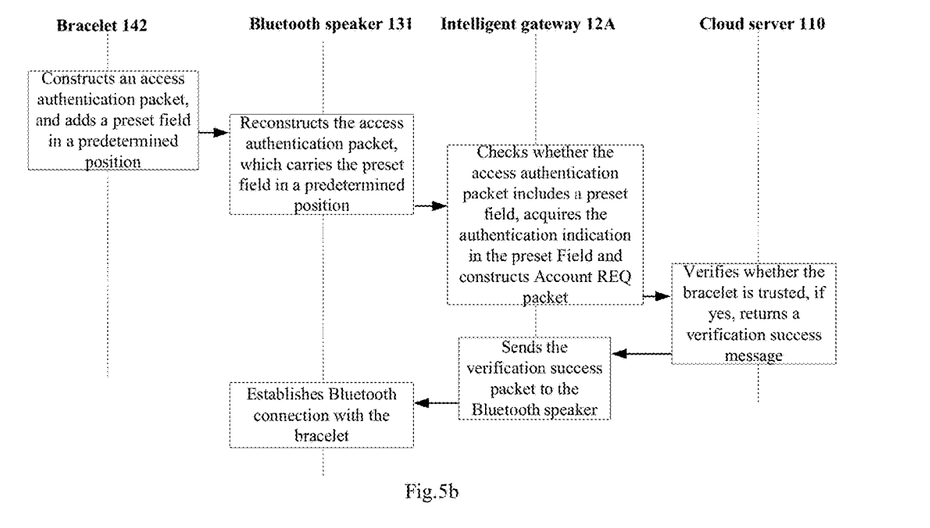
FIG. 5b schematically illustrates an interacting process of a method for wireless access authentication according to an example of the disclosure.

After that, the user may attempt to connect the Bluetooth speaker 131 with the bracelet 142. In such situation, the interaction process among the bracelet 142, the Bluetooth speaker 131, the intelligent gateway 12A and the cloud server 110 is shown in FIG. 5b.

The bracelet 142 may send a Bluetooth access authentication packet carried with Bluetooth authentication identification to the Bluetooth speaker 131. The preset field in the predetermined position of the Bluetooth access authentication packet may comprise the MAC address, the Bluetooth address and the ZigBee address of the bracelet 142, etc. In this way, the authentication identification of the terminal device to access the WLAN may be determined to comprise the MAC address, the Bluetooth address and the ZigBee address of the bracelet 142, etc. The Bluetooth speaker 131 may reconstruct a new Bluetooth access authentication packet according to the Bluetooth access authentication packet, and send it to the intelligent gateway 12A. The new Bluetooth access authentication packet carries the Bluetooth authentication identification, and comprises the authentication identification such as MAC address, Bluetooth address and ZigBee address of the bracelet 142 in the preset field in the predetermined position.

After receiving the Bluetooth access authentication packet from the Bluetooth speaker 131, the intelligent gateway 12A may extract and determines the MAC address, the Bluetooth address, the ZigBee address, etc. from the preset field in the predetermined position of the Bluetooth access authentication packet as the access authentication identification. Then, the intelligent gateway 12A may encrypt the access authentication identification, the identity information (mentioned as the association account identification thereinafter) of account information N associated with the intelligent gateway 12A, and security code M1 with a predetermined encryption algorithm. And wherein, the security code M1 may be acquired when the intelligent gateway 12A registered on the cloud server 110. Then the intelligent gateway 12A may add the encrypted information to an identity verification Account REQ packet with the source MAC address of MACA, and then sends the identity verification Account REQ packet to the cloud server 110.

After decrypting the received identity verification Account REQ packet by using a decryption algorithm corresponding to the predetermined encryption algorithm, the cloud server 110 may determine whether a record matching the access authentication identification (such as the MAC address, the Bluetooth address and the ZigBee address of the bracelet 142) carried in the identity verification packet exists in the trusted terminal device information of account information N corresponding to the association account identification carried in the identity verification packet. Since the bracelet 142 has been registered on the cloud server 110, the cloud server 110 may determine that the bracelet 142 is a trusted terminal device, and returns the verification success packet to the intelligent gateway 12A. The intelligent gateway 12A may feed the verification success packet back to Bluetooth speaker 131. Since the intelligent gateway 12A determines the PIN code manually input by the user previously as a local PIN code of the Bluetooth speaker 131, a Bluetooth connection may be established between the bracelet 142 and the Bluetooth speaker box 131 without inputting PIN code by the user.

Similarly, when the user arrives at the residence in city B, the bracelet 142 may connect directly to the intelligent gateway 12B and the smart lamp 133 without an access authentication operation, because the bracelet 142 has already been recorded as a trusted terminal device of the account information N on the cloud server 110.

Thus it can be seen that when being determined as a trusted terminal device of the account associated with the intelligent gateway, the terminal device may be permitted to pass wireless access authentication via any protocol, without manual authentication operation. Thus, it may simplify user's operation greatly, and reduce the administration work of the intelligent gateway.

This disclosure also discloses a device for wireless access authentication. The functions of the device for wireless access authentication may be achieved by software, hardware, or combination thereof. For example, the device for wireless access authentication may be a logic device which functions by reading corresponding machine executable instructions in a storage medium by a processor such as a central process unit (CPU).

Figure 6A:
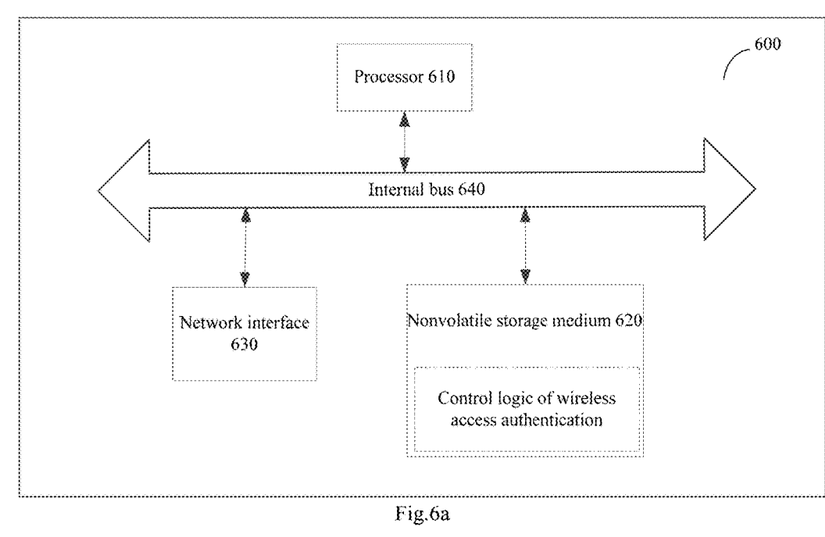
FIG. 6a is a schematic diagram illustrating a device for wireless access authentication according to an example of the disclosure.
Figure 6B:
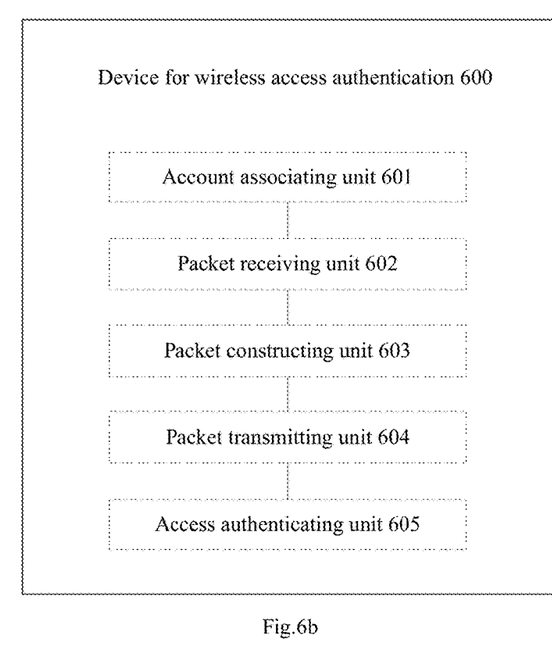
FIG. 6b is a schematic diagram illustrating the logic structure of a device for wireless access authentication according to an example of the disclosure.

Referring to FIG. 6a and FIG. 6b, a device for wireless access authentication 600 may be applied to an intelligent gateway, and comprise a processor 610 such as a CPU, a nonvolatile storage medium 620, and other hardware such as a network interface 630. The processor 610, nonvolatile storage medium 620, and network interface 630 may communicate with each other via internal bus 640. The device 600 may logically comprise the following function modules.

Account associating unit 601 may associate, on a cloud server, the intelligent gateway and account information of an account previously registered on the intelligent gateway.

Packet receiving unit 602 may receive an access authentication packet comprising authentication identification indicating a terminal device which is to access a WLAN via the intelligent gateway.

Packet constructing unit 603 may construct an identity verification packet which comprises access authentication identification and association account identification. And wherein, the access authentication identification represents the authentication identification of the terminal device carried in the access authentication packet, and the association account identification indicates the account previously registered on the intelligent gateway.

Packet transmitting unit 604 may transmit the identity verification packet to the cloud server.

Access authenticating unit 605 may permit a terminal device corresponding to access authentication identification carried in a verification success packet received from the cloud server to pass the access authentication, wherein the verification success packet is returned by the cloud server according to the saved account information of the one or more trusted accounts in response to receipt of the identity verification packet.

In another example, account associating unit 601 may acquire account information of an account registered on the intelligent gateway, and transmit the account information to the cloud server, so as for the cloud server to determine the account registered on the intelligent gateway as a trusted account and establish correspondence between the account information of the trusted account and the intelligent gateway.

In another example, account associating unit 601 may acquire a security code returned from the cloud server in response to receipt of the account information.

Packet constructing unit 603 may construct the identity verification packet according to the access authentication identification, the association account identification, and the security code.

In another example, packet receiving unit 602 may receive the access authentication packet sent from the terminal device or a relay device previously registered on the intelligent gateway.

In another example, packet receiving unit 602 may receive the access authentication packet sent from the relay device previously registered on the intelligent gateway, wherein a preset field of the access authentication packet includes authentication identification indicating a terminal device which is to access the WLAN managed by the intelligent gateway through the relay device.

Access authentication unit 605 may feed the verification success packet back to the relay device, so that the relay device permits the terminal device corresponding to the access authentication identification carried in the verification success packet to access the WLAN managed by the intelligent gateway via the relay device.

In another example, the authentication identification of the terminal device may comprise one or more of an MAC address, a Bluetooth address, a ZigBee address, an electrical label, etc.

In another example, the device for wireless access authentication 600 may also comprise a field checking unit, which may determine whether there is a preset field in the predetermined position of the access authentication packet. If there is a preset field in the predetermined position of the access authentication packet, the authentication identification such as the MAC address, Bluetooth address, ZigBee address and electronic label recorded in the preset field, may be determined as the access authentication identification of the terminal device. If there is no preset field, the source MAC address of the access authentication packet may be determined as the access authentication identification of the terminal device.

Figure 7A:
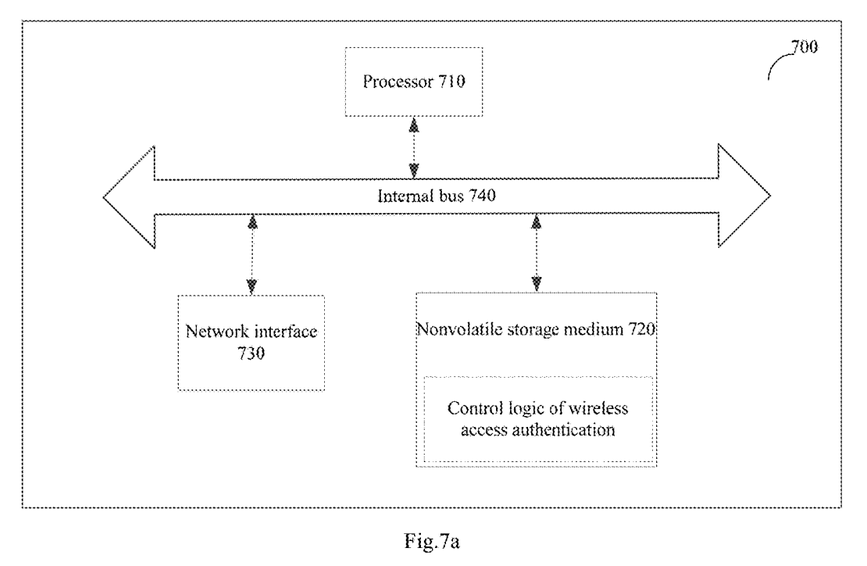
FIG. 7a is a schematic diagram illustrating a device for wireless access authentication according to an example of the disclosure.
Figure 7B:
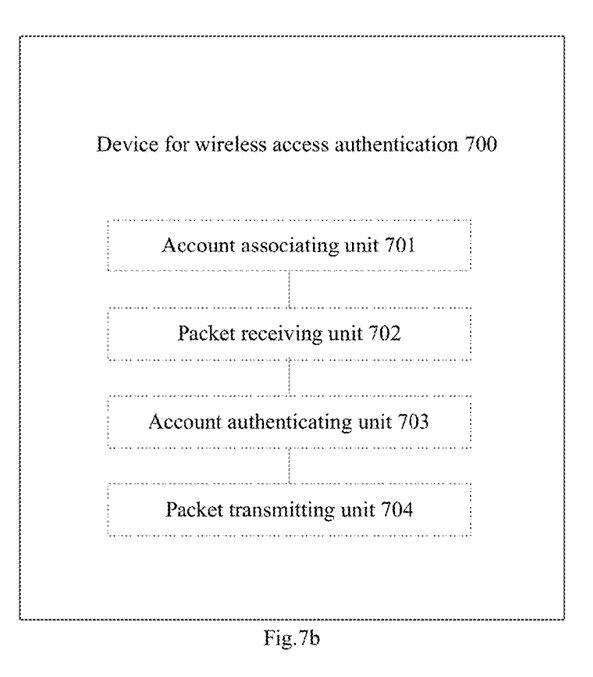
FIG. 7b is a schematic diagram illustrating the logic structure of a device for wireless access authentication according to an example of the disclosure.

Referring to FIG. 7a and FIG. 7b, a device for wireless access authentication 700 may be applied to a cloud server, and comprise a processor 710 such as a CPU, a nonvolatile storage medium 720, and other hardware such as network interface 730. The processor 710, nonvolatile storage medium 720, and network interface 730 may communicate with each other via internal bus 740. The device 700 may logically comprise the following function modules.

Account associating unit 701 may associate an intelligent gateway and account information of an account previously registered on an intelligent gateway.

Packet receiving unit 702 may receive an identity verification packet sent from the intelligent gateway. The identity verification packet comprises access authentication identification and association account identification. The access authentication identification represents authentication identification indicating the terminal device which is to access the WLAN managed by the intelligent gateway, and the association account identification indicates an account registered on the intelligent gateway.

Account authentication unit 703 may determine whether the access authentication identification exists in trusted terminal device information of pre-saved trusted account according to the association account identification.

Packet transmitting unit 704 may return a verification success packet carried with the access authentication identification to the intelligent gateway when the access authentication identification exists in the trusted terminal device information.

In another example, account associating unit 701 may receive the account information of the account previously registered on the intelligent gateway transmitted by the intelligent gateway, and determine the account previously registered on the intelligent gateway as a trusted account so as to establish correspondence between the account information of the trusted account and the intelligent gateway.

In another example, account associating unit 701 may also send a security code to the intelligent gateway in response to receipt of the account information.

Thus it can be seen that in a cloud server, the device for wireless access authentication may associate an intelligent gateway with account information of an account registered on the intelligent gateway. When the intelligent gateway receives an access authentication packet carried with authentication identification of a terminal device which is to access WLAN, it may construct an identity verification packet by using the authentication identification of the terminal device as access authentication identification and using identity information of the account previously registered on the intelligent gateway as association account identification. Then the intelligent gateway may send the identity verification packet carrying the access authentication identification and the association account identification to the cloud server. When determining the terminal device corresponding to the access authentication identification as a trusted terminal device according to the identity verification packet, the cloud server may instruct the intelligent gateway to permit the terminal device corresponding to the access authentication identification to pass the access authentication. Consequently, when a terminal device intends to access multiple different WLANs, this method may be used for unified authentication, without multiple security verification for each WLAN. In this way, user operations can be reduced and less authentication information during the authentication process will be generated, which avails to intelligent gateway management.

The foregoing example are merely illustrative but not intended to limit the disclosure, and any modifications, equivalent substitutions, adaptations, thereof made without departing from the spirit and scope of the disclosure shall be encompassed in the claimed scope of the appended claims.

The invention claimed is:

1. A method for wireless access authentication, comprises:
receiving, by an intelligent gateway, an access authentication packet comprising an authentication identification indicating a terminal device which is to access a wireless local area network (WLAN) managed by the intelligent gateway, the access authentication packet is from the terminal device or a relay device previously registered on the intelligent gateway and wherein, in the case that the access authentication packet is from the relay device previously registered on the intelligent gateway, a preset field in the access authentication packet comprises an authentication identification indicating a terminal device which is to access the WLAN managed by the intelligent gateway via the relay device;

constructing, by the intelligent gateway, an identity verification packet comprising an access authentication identification and an association account identification, wherein, the access authentication identification represents the authentication identification of the terminal device carried in the access authentication packet, and the association account identification indicates an account registered on the intelligent gateway;

transmitting, by the intelligent gateway, the identity verification packet to a cloud server, wherein, the cloud server saves account information of one or more trusted accounts;

permitting, by the intelligent gateway, a terminal device corresponding to access authentication identification carried in a verification success packet received from the cloud server to access the WLAN, wherein the verification success packet is returned by the cloud server according to the saved account information of the one or more trusted accounts in response to receipt of the identity verification packet, wherein permitting the terminal device corresponding to the access authentication identification carried in the verification success packet to access the WLAN, comprises:
feeding back, by the intelligent gateway, the verification success packet to the relay device, so that the relay device permits the terminal device corresponding to the access authentication identification carried in the verification success packet to access the WLAN managed by the intelligent gateway via the relay device.

2. The method according to claim 1, further comprises:
acquiring, by the intelligent gateway, account information of an account registered on the intelligent gateway;
transmitting, by the intelligent gateway, the account information to the cloud server, so as for the cloud server to determine the account registered on the intelligent gateway as a trusted account and establish correspondence between the account information of the trusted account and the intelligent gateway.

3. The method according to claim 2, further comprises:
acquiring, by the intelligent gateway, a security code returned by the cloud server in response to receipt of the account information;
the identity verification packet further comprises the security code.

4. The method according to claim 1, wherein, before constructing the identity verification packet, the method further comprises:
determining, by the intelligent gateway, whether the access authentication packet includes a preset field;
extracting, by the intelligent gateway, the content in the preset field as the authentication identification of the terminal device if the access authentication packet includes the preset field;

determining, by the intelligent gateway, a source Media Access Control (MAC) address of the access authentication packet as the authentication identification of the terminal device if the access authentication packet does not include the preset field.

5. The method according to claim 1, wherein the intelligent gateway connects to the terminal device via one of a Wireless-Fidelity (WIFI), ZigBee or Bluetooth protocol.

6. The method according to claim 1, wherein the terminal device connects to the intelligent gateway via a non Wi-Fi protocol.

7. The method according to claim 1, wherein the relay device has previously registered on the intelligent gateway as part of an account registration.

8. A method for wireless access authentication, comprises:
receiving, by a cloud server, an identity verification packet transmitted by an intelligent gateway, wherein, the identity verification packet comprises an access authentication identification and an association account identification, the access authentication identification represents an authentication identification indicating a terminal device which is to access the WLAN managed by the intelligent gateway, and the association account identification indicates an account registered on the intelligent gateway, wherein the identify verification packet is from the terminal device or a relay device previously registered on the intelligent gateway and wherein, in the case that the access authentication packet is from the relay device previously registered on the intelligent gateway, a preset field in the access authentication packet comprises an authentication identification indicating a terminal device which is to access the WLAN managed by the intelligent gateway via the relay device;
determining, by the cloud server, whether the access authentication identification exists in trusted terminal device information of a pre-saved trusted account according to the association account identification; and
returning, by the cloud server, a verification success packet carried with the access authentication identification to the intelligent gateway if the access authentication identification exists in the trusted terminal device information, wherein the verification success packet indicates to the intelligent gateway to permit the terminal device corresponding to the access authentication identification carried in the verification success packet to access the WLAN and the verification success packet indicates to the relay device to permit the terminal device corresponding to the access authentication identification carried in the verification success packet to access the WLAN managed by the intelligent gateway via the relay device.

9. The method according to claim 8, further comprises:
receiving, by the cloud server, account information of the account registered on the intelligent gateway transmitted by the intelligent gateway;
determining, by the cloud server, the account registered on the intelligent gateway as a trusted account so as to establish correspondence between the account information of the trusted account and the intelligent gateway.

10. A device including a processor and a non-transitory storage medium for storing machine executable instructions corresponding to functional logic of wireless access authentication, and by executing the machine executable instructions, the processor is caused to:
receive an access authentication packet comprising an authentication identification indicating a terminal device which is to access a wireless local area network (WLAN) managed by an intelligent gateway wherein, the access authentication packet is from the terminal device or a relay device previously registered on the intelligent gateway and in the case that the access authentication packet is from the relay device previously registered on the intelligent gateway, a preset field in the access authentication packet comprises an authentication identification indicating a terminal device which is to access the WLAN managed by the intelligent gateway via the relay device;
construct an identity verification packet comprising an access authentication identification and an association account identification, wherein, the access authentication identification represents the authentication identification of the terminal device carried in the access authentication packet, and the association account identification indicates an account registered on the intelligent gateway;
transmit the identity verification packet to a cloud server, wherein, the cloud server saves account information of one or more trusted accounts;
permit a terminal device corresponding to an access authentication identification carried in a verification success packet received from the cloud server to access the WLAN, wherein the verification success packet is returned by the cloud server according to the saved account information of the one or more trusted accounts in response to receipt of the identity verification; and
feed back the verification success packet to the relay device, so that the relay device permits the terminal device corresponding to the access authentication identification carried in the verification success packet to access the WLAN managed by the intelligent gateway via the relay device.

11. The device according to claim 10, the machine executable instructions further cause the processor to:
acquire account information of an account registered on the intelligent gateway;
transmit the account information to the cloud server, so as for the cloud server to determine the account registered on the intelligent gateway as a trusted account and establish correspondence between the account information of the trusted account and the intelligent gateway.

12. The device according to claim 11, the machine executable instructions further the processor to:
acquire a security code returned by the cloud server in response to receipt of the account information;
the identity verification packet further comprises the security code.

13. The device according to claim 10, wherein, the machine executable instructions further cause the processor to:
determine whether the access authentication packet includes a preset field;
extract the content in the preset field as the authentication identification of the terminal device if the access authentication packet includes the preset field;
determine a source Media Access Control (MAC) address of the access authentication packet as the authentication identification of the terminal device if the access authentication packet does not include the preset field.

14. The device according to claim 10, wherein the intelligent gateway connects to the terminal device via one of a Wireless-Fidelity (WIFI), ZigBee or Bluetooth protocol.

15. The device according to claim 10, wherein the terminal device connects to the intelligent gateway via a non Wi-Fi protocol.

16. The device according to claim 10, wherein the relay device has previously registered on the intelligent gateway as part of an account registration.

17. A device including a processor and a non-transitory storage medium for storing machine executable instructions corresponding to functional logic of wireless access authentication, and by executing the machine executable instructions, the processor is caused to:

receive an identity verification packet transmitted by an intelligent gateway, wherein, the identity verification packet comprises an access authentication identification and an association account identification, the access authentication identification represents an authentication identification indicating a terminal device which is to access the WLAN managed by the intelligent gateway, and the association account identification indicates an account registered on the intelligent gateway, wherein the identify verification packet is from the terminal device or a relay device previously registered on the intelligent gateway and wherein, in the case that the access authentication packet is from the relay device previously registered on the intelligent gateway, a preset field in the access authentication packet comprises an authentication identification indicating a terminal device which is to access the WLAN managed by the intelligent gateway via the relay device;

determine whether the access authentication identification exists in trusted terminal device information of a pre-saved trusted account according to the association account identification; and return a verification success packet carried with the access authentication identification to the intelligent gateway if the access authentication identification exists in the trusted terminal device information, wherein the verification success packet indicates to the intelligent gateway to permit the terminal device corresponding to the access authentication identification carried in the verification success packet to access the WLAN and the verification success packet indicates to the relay device to permit the terminal device corresponding to the access authentication identification carried in the verification success packet to access the WLAN managed by the intelligent gateway via the relay device.

18. The device according to claim 17, the machine executable instructions further cause the processor to:

receive account information of the account registered on the intelligent gateway transmitted by the intelligent gateway;

determine the account registered on the intelligent gateway as a trusted account so as to establish correspondence between the account information of the trusted account and the intelligent gateway.

* * * * *